United States Patent Office 3,796,750
Patented Mar. 12, 1974

3,796,750
PROCESS FOR THE MANUFACTURE OF PURE L-N-BENZOYL-3,4-DIHYDROXYPHENYLALANINE
Hans Schubel, Siegburg-Seligenthal, Paul Janssen, Bensberg-Refrath, and Heinz Ratz, Troisdorf, Germany, assignors to Dynamit Nobel Aktiengesellschaft, Troisdorf, Germany
No Drawing. Filed Dec. 18, 1970, Ser. No. 99,530
Claims priority, application Germany, Dec. 20, 1969,
P 19 63 991.9
Int. Cl. C07c 103/30
U.S. Cl. 260—519       5 Claims

ABSTRACT OF THE DISCLOSURE

Process of producing L-N-benzoyl-3,4-dihydroxyphenyl-alanine by resolving a mixed DL-N-benzoyl-3,4-dihydroxyphenyl-alanine; recovering the L-isomer; reacting the D-isomer with acetic anhydride; precipitating the acetoxy derivative thus formed; hydrolyzing the acetoxy derivative with alkali to form racemic DL-N-benzoyl-3,4-dihydroxyphenylalanine; resolving the racemate; recovering the L-isomer; and recycling the D-isomer.

---

The invention relates to a process for the manufacture of the pure optical antipode from racemic N-benzoyl-3,4-dihydroxyphenylalanine.

In this specification and claims, all compounds from which dextrorotatory 3,4 - dihydroxyphenylalanine (D–DOPA) can be obtained are identified by the prefix D-, and all those from which levorotatory 3,4-dihydroxyphenylalanine (L–DOPA) are identified by the prefix L-.

The most common method of separating a racemate consists in transforming the optical antipodes to disastereomers by the formation of compounds with a suitable optically active substance. Ordinarily, a diastereomeric salt of a racemic acid is formed by reaction with an optically active base, or a diastereometric salt of a racemic base is formed by reaction with an optically active acid. The diastereomers obtained can then be separated, usually by crystallization from a suitable medium.

This procedure, however, has the disadvantage that 50% of the starting material used, or whatever proportion there is of the unwanted isomer, has to be discarded as a useless byproduct if only one of the optical antipodes is needed. This results in significant losses, especially if the racemic starting material is a valuable and hard-to-produce compound, as in the case of DL-N-benzoyl-3,4-dihydroxyphenylalanine which is an intermediate for the preparation of 3,4-dihydroxyphenylalanine.

It is, therefore, an object of this invention to provide a novel means to transform DL-N-benzoyl-3,4-dihydroxyphenylalanine to the L-N-benzoyl-3,4-dihydroxyphenylalanine, which is used for the preparation of L–DOPA, without producing the corresponding D- form as a byproduct.

Other and additional objects of this invention will be apparent from a consideration of this entire specification including the claims hereof.

In accord with and fulfilling these objects, one aspect of this invention resides in converting D-N-benzoyl-3,4-dihydroxyphenylalanine to DL-N-benzoyl-3,4-dihydroxyphenylalanine; resolving this racemate; recovering the L-isomer; and recycling the D-isomer. This process is carried out by the following steps:

(A) Separating a mixture of D- and L-N-benzoyl-3,4-dihydroxyphenylalanine into its D- and L-isomeric fractions by conventional technique;
(B) Recovering the L-isomer;
(C) Reacting the D-isomer with acetic anhydride at elevated temperature whereby producing the acetyl derivative;
(D) Adding water to the reaction mixture whereby precipitating said acetyl derivative;
(E) Treating the precipitate with aqueous alkali whereby splitting of said acetyl racicals;
(F) Thereby producing from said D-isomer a racemic mixture of D- and L-isomers.
(G) And recycling said mixture to (A) above.

The separation of the optical antipodes, which represents the first stage of the process of the invention, can be performed by any desired method, many such methods being known in the art. It is especially advantageous, however, to transform racemic N-benzoyl-3,4-dihydroxyphenylalanine to the corresponding cinchonine salt, and to separate this salt into the optical antipodes by crystallization from a homogenous liquid phase consisting of water and a lower aliphatic alcohol, ether or ketone with 2 to 8 carbon atoms, or a mixture of such compounds.

Especially suitable for this purpose are aqueous acetone, aqueous n-butanol, aqueous methyl ethyl ketone containing a small amount of isopropanol, an aqueous mixture of isopropyl ether and isopropanol, aqueous isopropanol and aqueous ethanol. It is preferred that the liquid contain at least 1 mole of water per mole of salt.

The cinchonine salts obtained in this process are then transformed by means of an acid or base hydrolysis to the pure optical antipodes, D- and/or L-N-benzoyl-3,4-dihydroxyphenylalanine.

The L-N-benzoyl-3,4-dihydroxyphenylalanine obtained can be transformed to L-3,4-dihydroxyphenylalanine while retaining the desired optical isomeric configuration by splitting off the benzoyl radical. This can best be performed by saponification with HCl.

The D-form of N-benzoyl-3,4-dihydroxyphenylalanine which occurs as a byproduct can then be treated according to the invention with acetic anhydride, with heating, until a solution is formed. For this purpose, the temperature can be raised to the boiling temperature of the acetic anhydride, but lower temperature down to about 40 to 100° C., preferably 60–90° C. also serve the purpose. The amount of acetic acid anhydride used amounts to at least 3 moles per mole of D-N-benzoyl-3,4-dihydroxyphenylalanine. Usually, however, the use of a greater excess of acetic acid anhydride is preferred.

The solution obtained is then treated with enough water to form a precipitate. For this purpose the still warm solution can be poured into water or water can be added to the solution. It has been found that treatment with water is an important feature of the process of the invention. The water should be used in a mole ratio of 5,000 to 20,000 per mole acetyl derivative. The temperature of the precipitation step should be 10 to 100° C., preferably 30–40° C. For if an attempt is made to perform removal of the acetic anhydride by evaporation in vacuo, a product is obtained which cannot be used for the further stages of the process.

The compound produced in this stage is believed to be N-benzoyl-3,4-diacetoxyphenylalanine. The acetyl radicals of this product (intermediate) are saponified by known methods, as for example by treatment with aqueous alkalies, especially aqueous NaOH. In this manner, racemic N-benzoyl-3,4-dihydroxyphenylalanine is produced, which is re-used in the first stage of the process, the resolution of the racemate.

By this process it is possible to transform racemic N-benzoyl-3,4-dihydroxyphenylalanine, in substantially quantitative yields to the pure L-compound, which is then transformed to L-DOPA by splitting off the benzoyl radical by known means but retaining the configuration.

This invention will be illustrated by the following example which is itself not limiting on the scope of this invention.

EXAMPLE

In a 250-ml. round flask, 30.1 g. D-N-benzoyl-3,4-dihydroxyphenylalanine (0.1 mole) is heated with stirring at about 80° C. with 100 ml. of acetic anhydride. After about 15 minutes this D-isomer had dissolved. Stirring is continued at this temperature, and then the still hot contents of the flask are poured into about 1 liter of water with vigorous stirring. A colorless precipitate forms, which is suction filtered, washed with a large amount of water, and finally boiled for about 1 hour in about 1 liter of water.

Then the precipitate is heated with an aqueous solution of about 10% NaOH, whereupon it goes into solution. After about 15 minutes the solution is cooled and acidified with HCl or $H_2SO_4$. The hydrolyzed product that crystallizes out is filtered and recrystallized from water.

According to elemental analysis, infrared spectrum and DC, this substance is racemic N-benzoyl-3,4-dihydroxyphenylalanine monohydrate.

M.P. = 197° C.
$[\alpha]_D^{20} = 0°$ (c. = 1; methanol)
Yield: 29.7 g. (= 93% of the theory)

This product is then resolved by reacting to produce the corresponding cinchonine salt from which the L-isomer is recovered.

Dihydroxy (3,4)-phenylalanine is a known compound in both of its racemic forms. It has utility particularly as a constituent of proteins.

What is claimed is:

1. A process for producing L-N-benzoyl-3,4-dihydroxyphenylalanine from racemic N-benzoyl-3,4-dihydroxyphenylalanine which comprises the steps of:
    (a) separating a mixture of D- and L-N-benzoyl-3,4-dihydroxyphenylalanine by forming a cinchonine salt of said racemic N-benzoyl-3,4-dihydroxyphenylalanine, separating optical antipodes from such salt by crystallization thereof from a homogeneous liquid phase containing water and an alkanol, an alkyl ether or an alkyl ketone, having 2 to 8 carbon atoms, provided that at least one mole of water per mole of salt is present;
    (b) reacting at a temperature between 40 and 100° C. D-N-benzoyl-3,4-dihydroxyphenylalanine with at least 3 moles of acetic anhydride per mole of D-N-benzoyl-3,4-dihydroxyphenylalanine to form the acetyl derivative;
    (c) precipitating said acetyl derivative by adding water thereto in a mole ratio of 5,000 to 20,000 per mole acetyl derivative at a temperature between 10 and 100° C.;
    (d) hydrolyzing the acetyl derivative with an alkali to form racemic DL N-benzoyl-3,4-dihydroxyphenylalanine; and
    (e) resolving said racemate according to step (a).

2. A process as claimed in claim 1 wherein said homogeneous liquid is selected from the group consisting of aqueous acetone, aqueous n-butanol, aqueous methyl ethyl ketone mixed with isopropanol and aqueous mixture of isopropyl ether and isopropanol, aqueous isopropanol, and aqueous ethanol.

3. A process as claimed in claim 1 wherein said step b is carried out at a temperature between 60 and 90° C.

4. A process as claimed in claim 1 wherein said alkali is caustic soda.

5. A process as claimed in claim 1 wherein said resolution is by crystallization from an acetone-water homogeneous liquid having at least 1 mole of water per mole of salt.

References Cited
UNITED STATES PATENTS 3,366,679   1/1968   Reinhold et al. _____ 260—519

OTHER REFERENCES

Greenstein et al., "Chemistry of the Amino Acids," Wiley & Sons, Inc (1961), pp. 715–728.

Ajnomoto Co., Inc., Chem. Abst. 5638f (1964).

LORRAINE A. WEINBERGER, Primary Examiner

J. F. TERAPANE, Assistant Examiner

U.S. Cl. X.R.
260—284, 479 R